United States Patent [19]

Rankin, Jr.

[11] 4,142,694
[45] Mar. 6, 1979

[54] BAIT CASTING FISHING REEL

[76] Inventor: Marvin L. Rankin, Jr., 3909 Wedgeway Dr., Fort Worth, Tex. 76133

[21] Appl. No.: 442,386

[22] Filed: Feb. 14, 1974

Related U.S. Application Data

[63] Continuation of Ser. No. 314,499, Dec. 13, 1972, abandoned, which is a continuation of Ser. No. 74,009, Sep. 12, 1970, abandoned.

[51] Int. Cl.² ............................................. A01K 89/02
[52] U.S. Cl. .................................... 242/211; 242/213; 242/220
[58] Field of Search ............... 242/211, 212, 213, 214, 242/215, 216, 217, 218, 219, 220, 221, 84.51 R, 84.5 R, 84.53

[56] References Cited

U.S. PATENT DOCUMENTS

| | | | |
|---|---|---|---|
| 465,579 | 12/1891 | Knudsen | 242/211 |
| 625,166 | 5/1899 | Hastings | 242/211 |
| 781,776 | 2/1905 | Leavers | 242/211 |
| 790,676 | 5/1905 | Carlton | 242/84.51 R |
| 842,551 | 1/1907 | Hunter | 242/221 |
| 1,939,148 | 12/1933 | Spenny | 242/220 |
| 2,002,424 | 5/1935 | Weaver | 242/211 |
| 2,129,386 | 9/1938 | Schafer | 242/219 |
| 2,180,566 | 11/1939 | Thompson | 242/84.51 R |
| 2,263,836 | 11/1941 | Balz et l. | 242/216 |
| 2,536,583 | 1/1951 | Tank | 242/216 |
| 2,573,240 | 10/1951 | Berlinger | 242/212 X |
| 2,643,131 | 6/1953 | King | 242/217 |
| 3,104,850 | 9/1963 | Wood | 242/212 X |
| 3,167,272 | 1/1965 | Frode | 242/213 |
| 3,171,609 | 3/1965 | Baenziger | 242/216 X |
| 3,652,031 | 3/1972 | Kosek | 242/219 |

FOREIGN PATENT DOCUMENTS 544901  7/1922  France ..................................... 242/211

Primary Examiner—Billy S. Taylor
Attorney, Agent, or Firm—Bruce G. Klaas; Dennis K. Shelton

[57] ABSTRACT

A spool-type fishing reel is provided with a direct drive mechanism between the spool and the crank handle including a positive acting clutch which selectively disengages the spool from the drive mechanism for free spooling, and is disengaged by a lever positioned to be engaged by the thumb of the angler during casting, and upon release, conditions the clutch to be engaged upon line payout. An adjustable drag mechanism acts on the direct drive mechanism to retard spool rotation on line payout.

3 Claims, 11 Drawing Figures

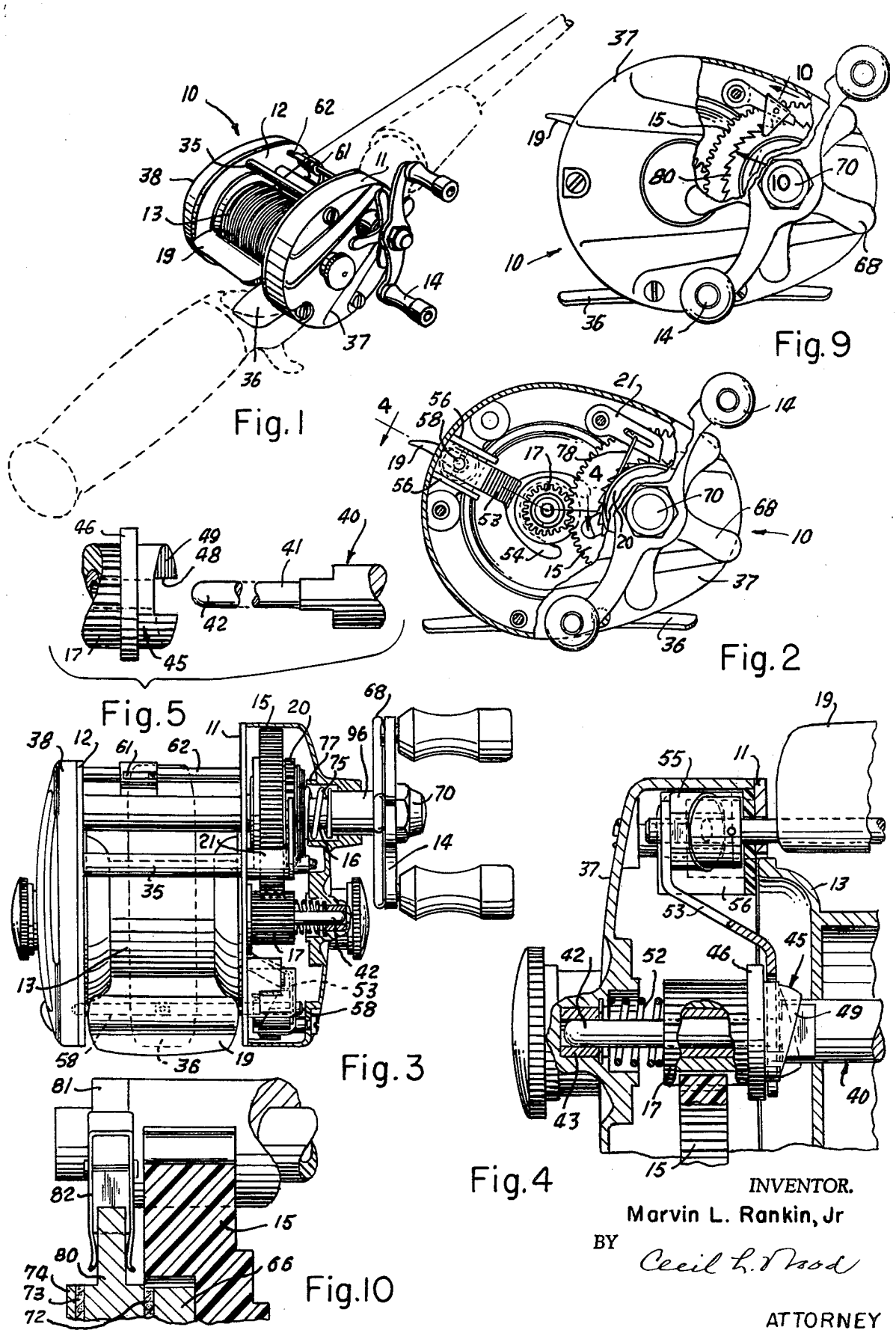

INVENTOR.
Marvin L. Rankin, Jr.
BY
ATTORNEY

BAIT CASTING FISHING REEL

This is a continuation of application Ser. No. 314,499, filed Dec. 13, 1972, now abandoned, which was a continuation of Ser. No. 74,009, filed Sept. 12, 1970, and now abandoned.

BACKGROUND AND SUMMARY OF THE INVENTION

This invention relates to control mechanisms for bait casting fishing reels.

One problem which faces users of bait casting reels is the occurrence of a backlash, particularly at an inopportune time, and it is desirable therefore that various controls be provided on bait casting reels which serve to assist the angler in preventing backlash.

One form of control device which will aid in preventing backlash, as well as for other purposes, in an adjustable drag control for varying the resistance to line pay-out as the spool is rotated while playing the fish. In one type of adjustable drag mechanism, referred to as a conventional star drag, the drive mechanism between the crank handle and the spool is a friction drive with means for varying the friction to increase or decrease the drag as desired. With this type of drive and drag mechanism there is no direct drive between the crank handle and the spool and, while this is desirable for certain types of fishing, it is preferable for other types of fishing to provide a direct or positive acting drive between the crank handle and spool as an additional measure of control.

Many bait casting reels provide the control feature of a free spool release mechanism wherein a positive acting clutch is provided to release the spool from the remainder of the drive mechanism for casting purposes, and for reengaging the spool and the drive mechanism during the retrieving of the line or during the playing of a fish to have the benefit of the adjustable drag provided in the reel. Some forms of such devices include a control lever placed at one side of the reel for disengaging the clutch, and the clutch is re-engaged either when the crank handle is operated to retrieve line or possibly by some other positive movement of a control lever.

One form of such free spooling release mechanism is described in applicant's U.S. Pat. No. 3,489,366 issued Jan. 13, 1970, and entitled Reel for Fishing Rod. The mechanism described in this patent is one in which the clutch is re-engaged upon operation of the crank handle to retrieve line. This type of mechanism presents a possible disadvantage, as when a fish strikes the bait immediately upon impact with the water surface, or prior to the angler's grasping the crank handle to retrieve line, the spool is in the free spooling condition and primed for a backlash. The righthanded angler, prior to retrieving line normally transfers the rod from his right hand to his left hand after casting to operate the crank handle with his right hand. Should a fish strike the bait during this hand transfer operation a severe backlash will likely occur.

An object of this invention is to obviate the above-mentioned disadvantages of known reel control mechanisms by providing improved control mechanisms for preventing backlash and to provide a free spooling release mechanism which automatically re-engages when the line is withdrawn from the spool.

A still further object of this invention is to provide a free spooling release mechanism which is conveniently operated by the angler during normal casting.

Still another object of this invention is to provide a bait casting reel having a direct drive between the crank handle and spool and including an adjustable drag effective upon playing out line from the spool.

For accomplishing these objects a reel according to the invention includes an axially aligned spool and spool pinion including coacting positively engaging clutch members defining a free spooling release clutch. The pinion and its associated clutch member are movable axially relative to the spool through an elongated operator bar pivotally mounted on the reel in position to be conveniently operated by the thumb of the angler while casting. The clutch is disengaged for free spooling during the cast and re-engaged at the completion of the cast. A drag mechanism is effective to retard spool rotation when the free spooling clutch is re-engaged.

The novel features and the advantages of the invention, as well as additional objects thereof, will be understood more fully from the following description when read in connection with the accompanying drawings.

DRAWINGS

FIG. 1 is a perspective view of a bait casting reel according to the invention as mounted on a rod shown in broken lines.

FIG. 2 is a view from the crank side of the reel of FIG. 1 with a portion of the cover shown broken away.

FIG. 3 is a top view of the reel as seen in FIG. 1 with a portion of the cover broken away to show the drive mechanism.

FIG. 4 is a fragmentary enlarged sectional view illustrating the free spooling release mechanism.

FIG. 5 is a fragmentary detail view of elements of the free spooling clutch mechanism.

FIG. 9 is a view from the crank side of the reel of FIG. 1 with the cover partially broken away to show an alternative form of ratchet-pawl assembly for the drag mechanism.

FIG. 10 is a fragmentary enlarged view of the ratchet-pawl assembly of FIG. 9.

DESCRIPTION OF THE PREFERRED EMBODIMENTS

Figure 6:
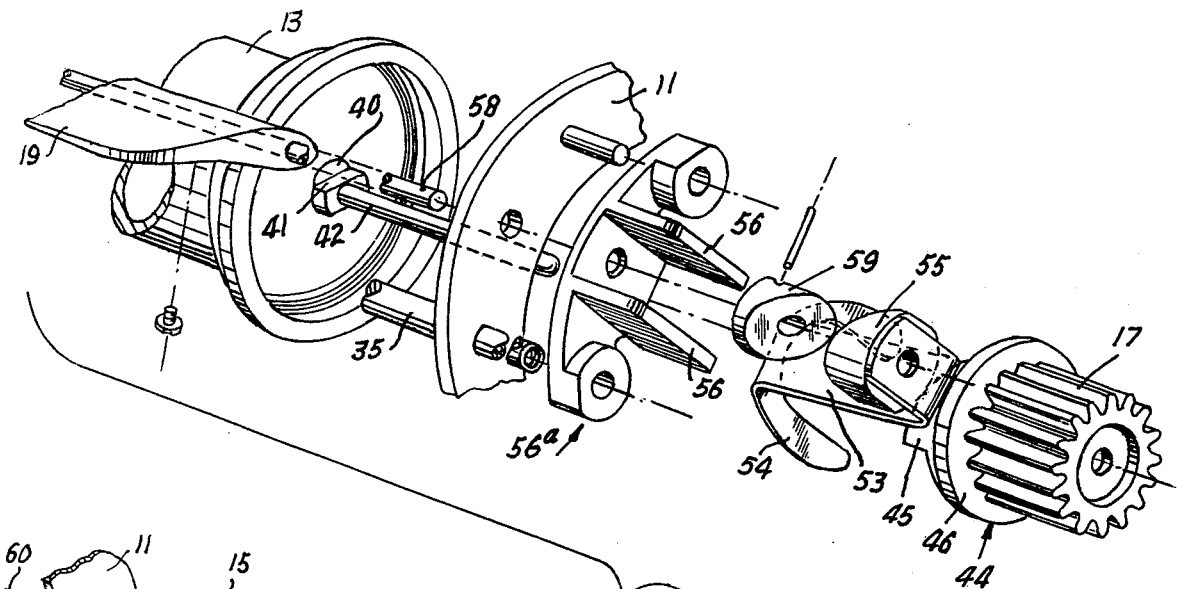
FIG. 6 is an exploded view of the elements and parts of the free spooling release mechanism.

FIGS. 1 through 11 illustrate one form of bait casting fishing reel 10, including a housing defined by end plate means in the form of a head plate 11 and a tail plate 12 spaced by suitable spacer bars, and having a spool means 13, including a length of fishing line L wound thereon, rotatably supported there between. The spool is rotated through drive means such as a direct drive mechanism including a crank handle 14 and a drive gear 15 coupled by a drive shaft 16, and a spool pinion 17 driven by the drive gear, the spool pinion being coupled to the spool through a positive engaging, free spooling release clutch. Manually operable clutch operating means in the form of a control bar 19 pivotally mounted between the head and tail plates controls the positive engaging clutch. An adjustable drag mechanism includes a ratchet wheel 20 and pawl 21, with the ratchet wheel coacting with friction elements nonrotatably mounted on the drive shaft to retard rotation of the direct drive mechanism.

FIGS. 12 through 15 illustrate another form of bait casting reel 25 of generally similar configuration, with only the head plate 26 being shown. A spool 27 rotatably supported between the head and tail plates is rotated by a direct drive mechanism comprising a crank handle 28 and drive gear 29 coupled by a drive shaft 30 which includes an integral carriage screw for the level wind mechanism, and a spool pinion 31 which is coupled to the spool through a positive acting free spooling release clutch operated by a control bar 32.

Referring now in detail to the reel shown in FIGS. 1 through 11, the housing means for the reel 10 includes head and tail end plates 11 and 12, respectively, which are assembled in spaced relation through several spacer bars 35. A mounting plate 36 is secured to the lower spacer bars by means of which the reel is secured to a fishing rod in a well-known manner. The head and tail plates have respective covers 37 and 38 which serve to enclose and protect operating parts mounted on the plates, and are decorative as well.

The spool 13 includes end flanges which are received within suitable recesses in the head and tail plates, and the spool is fixed to a spool shaft means 40 which is rotatably supported in suitable bearings in the respective plate covers 37 and 38 to provide a spool axis of rotation extending generally transversely to the longitudinal axis of the fishing rod R. The outer peripheral surfaces and inner side surfaces of the end plate means 11, 12, along with the outer peripheral surfaces of the spool means 13 define a cavity C, the inner portion of which is filled by the fishing line L, as indicated by dotted line 39 in FIG. 4. As best seen in FIG. 4, the spool shaft 40 has a larger diameter portion which extends through the spool and is provided at the head end with diametrically opposed flats or flat surfaces defining a clutch tang 41. A smaller diameter shaft extension 42 extends into a supporting bushing 43 in the head cover 37.

A clutch assembly 44 which includes the spool pinion 17 and clutch means in the form of a clutch member 45 spaced by an intervening washer defining a collar 46, is supported for rotation and for limited axial shifting on the shaft extension 42. The clutch member is formed with confronting axially extending bosses defining a transverse groove 48, dimensioned to receive the clutch tang 41, and axially facing cam surfaces 49 which engage the axially facing surfaces or shoulders of the tang during clutch engagement to guide the tang gradually into the clutch slot, this to insure positive and immediate clutch engagement when the spool is rotated when playing out the line.

As best shown in FIG. 4, the clutch assembly 44 is normally urged by a coil spring 52 to the engaged position wherein the tang 41 is received in the clutch groove 48. The clutch is disengaged by shifting the clutch assembly 44 to the left, as viewed in FIG. 4, against the force of the spring 52, by clutch operating lever means in the form of a lift bar 53 having a fork 54 formed at its inner end which receives the clutch member 45 and is positioned under the clutch collar 46. The outer end of the lift bar 53, opposite the fork 54, has a cam member 55 mounted thereon which is provided with opposing flat surfaces which engage and are guided within a channel defined by spaced parallel flanges 56 formed with a plate 56a secured to the head plate 11. The coacting cam member 55 and flanges 56 provide for reciprocating movement of the lift bar 53 in a direction parallel to the spool axis.

The clutch operating means further comprises thumb engageable force applying control surface means in the form of an elongated flat member 19 mounted on clutch control shaft means in the form of a pivot shaft 58 extending longitudinally therethrough adjacent to one edge of member 19 and which is pivotally anchored in the head and tail plates. As best seen in FIGS. 3 and 6 the shaft 58, at the head plate end, extends between the wall members 56 and has cam means in the form of a cam member 59 fixed thereon. The cam member 55 has an axial bore which receives the end of the shaft 58 so that the cam members 59 and 55 are axially aligned. These cam members are formed with mating faces disposed in a transverse plane inclined relative to the shaft 58 and disposed to lie contiguous to each other when the free spooling release clutch is engaged. When the control bar 19 is depressed, as will become apparent, the cam member 59 is rotated relative to the cam member 55 to effect axial separation of these members, and the lift bar 53 is shifted axially, with its associated cam member 55, to effect the lifting of the clutch assembly 44 to disengage the free spooling release clutch.

As shown in FIGS. 1 and 2, the control bar 19 is positioned on the reel for convenient operation by the thumb of the angler during casting, in much the same manner as when the thumb is used to brake the spool in conventional casting operations. The control bar 19 is depressed toward the rod to release the spool for total free spooling. At the end of the cast, when the bait strikes the water, the angler has normally braked the spool with his thumb. Upon releasing the control bar 19, the free spooling clutch may be immediately re-engaged under the force of the spring 52, should the clutch tang 41 and clutch groove 48 be appropriately aligned. Should these members not be aligned, the clutch member cam surfaces 48 will be urged against the tang 41 in a manner that rotation of the spool and tang, through withdrawal of line, for example, will immediately engage the free spooling release clutch.

A conventional level wind mechanism for the reel 10 includes a shaft 60 mounted for rotation in suitable bearings in the head and tail plates about an axis parallel to the spool axis, the shaft 60 defining a level wind worm gear between the head and tail plates. A level wind guide 61 driven by the level wind worm gear traverses the reel between the head and tail plates being guided on a guide bar 62. The shaft 60 extends through the head plate 11 to provide a support for the drive gear 15 and the drive shaft 16.

Figure 7:
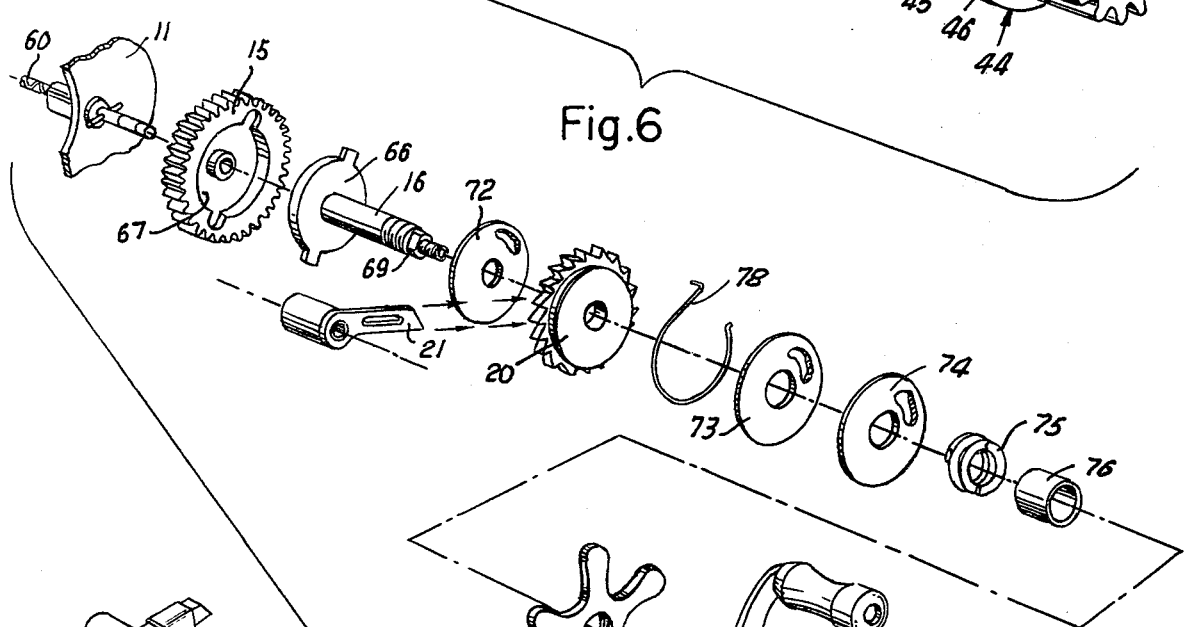
FIG. 7 is an exploded view of the elements and parts of the direct drive and drag mechanism according to one embodiment of the invention.
Figure 8:
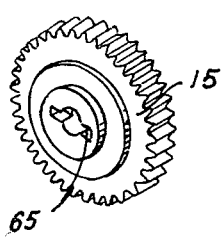
FIG. 8 is a perspective view of the drive gear shown in FIG. 7.

The shaft 60 is provided with a transverse pin 64 extending through the shaft adjacent to the outer face of the head plate 11, and the drive gear, as best seen in FIG. 8, is provided with a transverse groove 65 to accommodate the pin 64 when the gear is assembled on the shaft 60. In this manner, the drive gear 15 ia mounted on the shaft for rotation therewith. The drive shaft 16 has a nonrotatable eared washer 66 on its inner end which is received in a suitable recess 67 in the drive gear, as best seen in FIG. 7, whereby the drive shaft is nonrotatably coupled to the drive gear. The drive shaft is also provided with an axial bore to receive the extension of the shaft 60 to maintain the shafts 16 and 60 in axial alignment.

The drive shaft 16 extends from the head plate 11 through the head cover 37, and includes a larger diameter shank portion threaded at its outer end to accommodate an internally threaded star wheel 68. A flattened tang 69 is provided adjacent to the outer end of the larger diameter portion to be received in an oval opening in the crank handle 14 whereby the drive shaft is driven by the crank handle. The outer reduced diameter end of the drive shaft is threaded to accommodate a nut 70 and associated lock washer to retain the crank handle on the shaft. With this mechanism, rotation of the crank handle by the angler directly drives the spool 13 and the level wind worm gear in the shaft 60.

An adjustable drag mechanism for the reel 10 includes the following elements which are assembled on the drive shaft 16 in juxtaposed relation from the eared washer 66 toward the outer end of the shaft, each of the elements having an internal diameter slightly larger than the diameter of the shaft shank portion. These elements are a first drag washer 72 fabricated of a fiber material, such as asbestos for example, the ratchet wheel 20, a second drag washer 73 identical to the first drag washer, a metallic backing washer 74, a helical spring 75 and a sleeve 76.

In assembled relation, as best seen in FIG. 3, the sleeve 76 passes through a bearing opening in the head cover 37, and is received within this opening in relatively close fitting relation to define a bushing for the outer end of the drive shaft 16, and the sleeve is also axially slidable relative to the head cover as will become apparent. These parts are retained on the drive shaft 16 by the star wheel 68 which is threaded onto the outer end of the shaft 16. Again, as best seen in FIG. 3, the drag washers 72 and 73, the ratchet wheel 20 and the backing washer 74 are urged by the spring 75 toward the eared washer 66, and the force axially compressing these parts is adjustable through rotation of the star wheel relative to the shaft. A boss 77 integral with the head cover 37 defines an inward facing shoulder for limiting outward movement of this assembly.

A pawl 21 includes an integral sleeve shank which is pivotally supported on a transverse pivot pin on the head plate to be engaged or disengaged with the peripheral teeth of the ratchet wheel 20. As best seen in FIGS. 2 and 7, a C-shaped spring is retained on the ratchet wheel in frictional relation within a suitable annular groove so that the spring will tend to rotate with the ratchet wheel, and this spring includes an axially directed finger at one end which is received within a longitudinal slot in the pawl 21. With this arrangement, when the ratchet wheel is rotated in one direction (counterclockwise in FIG. 2), the spring rotates the pawl into engagement with the ratchet wheel teeth, and when the ratchet wheel is rotated in the other (clockwise) direction the pawl is disengaged from the teeth.

In operation, when the crank handle is operated to retrieve line, the pawl is disengaged from the ratchet wheel. Conversely, when line is being withdrawn from the spool and the drive mechanism is operated in a reverse direction, the rotation of the ratchet wheel brings the pawl into engagement to lock the ratchet wheel against rotation and the frictional force applied to the drag washers 72 and 73 through the spring and star wheel 68 provide an adjustable drag for the spool drive mechanism.

Figure 11:
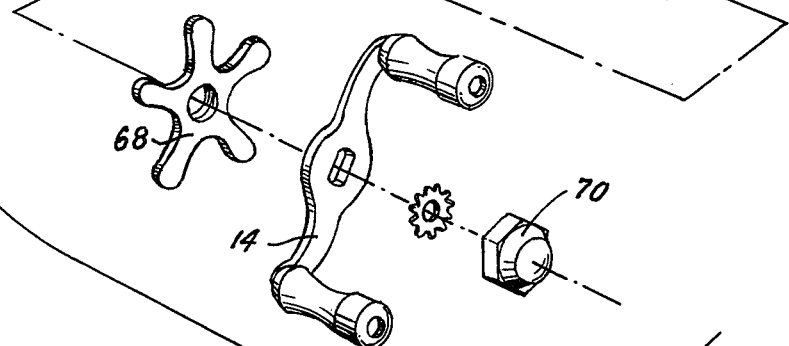
FIG. 11 is a perspective view of the pawl shown in FIGS. 9 and 10.

FIGS. 9, 10 and 11 illustrate an alternative form of ratchet and pawl assembly for performing the above-described functions. In this form, a ratchet wheel 80 is substantially identical in configuration to the above-described ratchet wheel 20, but without the annular groove means necessary to support a C-shaped spring 78. A pawl 81 for engagement with the ratchet wheel 80 includes an elongated arm and a transverse sleeve shank for pivotally mounting the pawl on an appropriate journal pin, and the U-shaped plate spring 82 is fixed to the pawl arm defining parallel tines which extend radially inwardly relative to the ratchet wheel and are urged toward each other to bear against opposing faces of the ratchet wheel. In this manner, the pawl is frictionally engaged with the ratchet wheel in a manner such that when the wheel is rotated in one direction (counterclockwise in FIG. 9) the frictional drag between the pawl spring and ratchet wheel urges the pawl into engagement with the peripheral ratchet teeth, while rotation of the ratchet wheel in the opposite (clockwise) direction urges the pawl out of engagement with the ratchet teeth. This arrangement operates the same as that previously described in that when the spool is rotated through withdrawal of line, the pawl is urged into engagement with a ratchet wheel to lock the wheel against rotation whereby the adjustable drag is effective to retard rotation of the spool.

Operation

In the operation of the reel, with the line retrieved the bait is cast in the usual manner. The angler grips the rod at the handle and his thumb is positioned adjacent to the spool so as to be ready to manually brake the spool when the bait strikes the water surface to prevent backlash. The control bar 19 is positioned so that when the angler has his thumb in the above-mentioned position to brake the spool, his thumb rests on the bar depressing it downwardly toward the rod thereby effecting the lifting of the clutch assembly 44 to disengage the free spooling release clutch. The spool 13 then is completely free of a driving mechanism.

Thus, the present invention comprises end plate means 11, 12 having generally similar outer peripheral configurations, as shown in FIGS. 2 and 9, held in fixed axially spaced relationship at opposite ends of spool shaft means 40 to define a cavity C therebetween having a generally similarly shaped outer peripheral configuration indicated by the dotted line 84 in FIG. 3. The spool means 13 is rotatably mounted and entirely confined within the cavity C. Similarly, the fishing line L wound on the spool, as shown in FIG. 1 and by dotted line 39 in FIG. 4, in a substantially fully wound position, is entirely confined within the cavity C. The clutch means 45 is coaxial with the central axis of spool shaft means 40 and is operable to engage and disengage the spool rewind drive means comprising pinion 17, drive gear 15, shaft 16, and crank handle 14. The clutch operating means comprises clutch control shaft means 58 rotatably supported by a pair of axially aligned bearing means 86, one of which is mounted in each housing means 37, 39, as shown in FIG. 2, in coaxial alignment with a pair of axially aligned inwardly oppositely facing annular shaft openings 88, one of which extends through each end plate 11, 12, next adjacent spool flange 90 and spaced a substantial distance inwardly of the outer peripheral surfaces 92, 94 of the housing means. The shaft means 58 has opposite end portions 96, 98, extending through the shaft openings 88 and rotatably supported by the bearing means 86 with a central axis of rotation extending generally parallel to the central axis of rotation of the spool shaft means 40 and located entirely within the cavity C in relatively closely spaced relationship to the line L wound on the spool means. The clutch operating means further comprises rotatable cam means 55, 59 having a central axis of rotation coaxial with the central axis of rotation of the shaft 58 and being operable by rotation of the shaft 58 in a first direction to disengage the clutch means 45 during casting and in a second opposite direction to re-engage the clutch means after casting. The clutch operating means further comprises thumb engageable force applying control surface means 19 fixedly sleevedly mounted on the clutch control shaft means 58 including a first radially outermost thumb engaging surface portion 100 extending generally radially outwardly from the central axis of rotation of the shaft 58 and being located at least in part within the cavity C. The surface means includes a second radially innermost thumb engaging surface portion 102 forming an extension of the first surface portion located next adjacent the line L on the spool 13 above the pivotal axis of the shaft 58, located entirely within the cavity C, and located relative to the line L on the spool 13 within a distance such as to enable a fisherman to simultaneously grasp the handle H of the fishing rod with one hand and place the thumb of the one hand on the surface portions 100, 102 with the tip of the thumb being located in close enough proximity to the line on the spool to permit simultaneous digital rotation of the shaft 58 by forces exerted by the thumb on the control surface means 19 and thumb tip engagement with the line L on the spool 13 to manually control rotational speed of the spool during casting to thereby prevent line backlash. As best illustrated in FIGS. 2 and 9, the control surface means 19 is located within the upper rear quadrant of the cavity C, is generally upwardly facing therewithin, and is manually movably tiltable about the central axis of the shaft 58 substantially within the confines of the cavity C during actuation of the clutch operating means. The terms "above," "upper rear quadrant," "upwardly facing," etc. as used in the specification and claims refer to the reel when in a normal fishing position on a fishing rod as illustrated in FIGS. 1 and 2.

As soon as the spool has been braked, the angler shifts his hand to grasp the handle with one hand while operating the crank handle with the other to retrieve the line. As soon as the operating bar 19 is released through removal of thumb pressure the free spooling clutch is conditioned to be engaged under the urging of the spring 52. Should the clutch groove 48 be aligned with the tang 41 at the moment of releasing the bar 19, the clutch will immediately re-engage. Should these members not be aligned, the cam surfaces of the clutch member 45 will engage the tang, and upon relative rotation of the clutch member 45 and spool shaft 40 the clutch will engage under the urging of the spring.

Should a fish strike the bait immediately as the bait strikes the water surface, or before the angler grasps the crank handle, the rotation of the spool caused by withdrawal of line will rotate the spool shaft relative to the clutch member to bring these parts into clutch engaging alignment, and eased into positive engagement through the riding of the tang along the sloping cam surfaces 49. If the bait is not struck by a fish, rotation of the crank handle by the angler will cause the same relative rotation of the clutch member and spool shaft 40 to effect the gradual and positive engagement of the clutch.

Following clutch engagement, during rotation of the spool by the crank, the pawl is urged by the associated pawl spring out of engagement with the ratchet wheel, whereby the ratchet wheel rotates with the drive shaft to provide for free line retrieval through the direct drive mechanism. Should a fish strike the bait during line retrieval, withdrawal of the line from the spool will effect reverse rotation of the direct drive mechanism bringing the pawl into engagement with the ratchet wheel teeth to provide the drag on the drive mechanism in accordance with the star wheel adjustment. Because of the direct drive mechanism, the crank handle will be rotated in reverse during line withdrawal.

If desired, the angler may stop line withdrawal by grasping the crank handle to prevent its rotation, and this will stop the spool rotation through the mechanical advantage provided through the direct drive mechanism. When the fish stops running, line is again retrieved in the usual manner.

What has been described are bait casting fishing reels having improved controls providing control functions not available in conventional reels of this type. A principal advantage of the reel according to the invention is that total free spooling is affected by the angler through the normal operation of placing his thumb adjacent to the reel spool to brake the spool at the end of the cast. The release of the free spooling clutch is then an inherent function accomplished by the angler in preparing to cast, and no independent and separate action is required to disengage the free spooling release mechanism.

Another feature and advantage of reels according to the invention is that the free spooling clutch is automatically either engaged or conditioned for re-engagement by inherent release of the clutch control lever when the angler shifts the rod in his hand for retrieving line. This re-engagement, or re-engagement conditioning, is effected immediately when the angler removes his thumb from the spool braking position, and does not wait for some other positive action such as actuating a control lever or beginning to retrieve line through operation of the crank handle. This means that should a fish strike the line during the shifting of the rod to line retrieving condition, the free spooling clutch is engaged to bring into play the drag control and thereby prevent backlash.

As with conventional reels, if the spool release clutch has not been already engaged, it will be immediately engaged upon slight rotation of the crank handle at the beginning of line retrieval.

A particular feature and advantage of a reel according to the invention is the combination of a positive drive for the spool and an adjustable drag control. For fresh water fishing, particularly where the fishing waters contain obstructions to fowl or snag the line, it is desirable to be able to abruptly stop the fish in the water and this can only be done with a positive drive. When the fish is taking line, the crank handle in the reel according to the invention is rotating in a reverse direction, and the angler may positively stop line payout by grasping the handle and, through the mechanical advantage provided by the drive mechanism, prevent spool rotation.

Additionally, the angler can positively reel in the fish when this is desired. These are features of known fresh water reels. However, with the combination of the adjustable drag mechanism additional advantages are provided. Should a fish strike the bait during line retrieval with such force that the angler loses the crank handle, the drag feature will prevent a backlash at a most inopportune time. During the playing of the fish, the angler can use the combination of the adjustable drag mechanism with manual thumb breaking to control the running of the fish, and yet have the advantage of the control to suddenly stop the fish if desired and to positively reel it in through the direct drive mechanism.

What is claimed is:

1. A bait casting reel of the type adapted to be mounted on a fishing rod comprising:
   reversely rotatable spool means adapted to receive a length of fishing line wound thereon and being rotatable in a first direction during casting to unwind line therefrom and being rotatable in a second direction after casting to rewind the line thereon,
   spool shaft means rotatably supporting said spool means about a spool axis of rotation extending generally transversely to the longitudinal axis of the fishing rod,
   first and second housing means axially spaced at opposite ends of said spool shaft means and defining a cavity therebetween having an outer peripheral configuration generally corresponding to the outer peripheral configuration of said housing means,
   said spool means and the fishing line wound thereon being mounted entirely within said cavity on said spool shaft means,
   manually operable spool drive means mounted on one of said housing means,
   clutch means in one of said housing means operable to drivably connect and disconnect said drive means and said spool shaft means,
   clutch operating means on said reel comprising:
      clutch control shaft means rotatably movable between a first position whereat said clutch means drivably connects said drive means and said spool shaft means and a second position whereat said clutch means disconnects said drive means from said spool shaft means,
      bearing means in each of said housing means rotatably supporting said clutch control shaft means with the central axis of rotation thereof extending generally parallel to said spool shaft means,
      said clutch control shaft means extending into and across said cavity and being located entirely within said cavity in relatively closely spaced relationship to the line wound on said spool means,
      rotatable cam means in one of said housing means operably connected to one end of said shaft means and having a central axis of rotation coaxial with said central axis of rotation of said clutch control shaft means and being operable by rotation of said clutch control shaft means in a first direction to disengage said clutch means during casting and being operable by rotation of said clutch control shaft means in a second opposite direction to re-engage said clutch means after casting,
      thumb engageable force applying control surface means mounted on said clutch control shaft means including a first outer surface portion extending generally radially outwardly of said central axis of rotation of said clutch control shaft means and being located at least in part within said cavity, and a second inner surface portion next adjacent the line on the spool being located above the central axis of rotation of said clutch control shaft means when in a fishing position on a fishing rod and located entirely within said cavity and forming an extension of said first outer surface portion and located relative to the line on said spool means within a distance such as to enable a fisherman to simultaneously grasp the handle of the fishing rod with one hand and place the thumb of the one hand on said thumb engageable force applying surface means with the tip of the thumb being located in close enough proximity to the line on said spool means to permit simultaneous rotatable actuation of said clutch control shaft means by forces exerted by the thumb on said thumb engageable force applying control surface means and thumb tip engagement with the line on said spool means to manually control rotational speed of said spool means to prevent line backlash during casting,
   said thumb engageable force applying control surface means being generally located, when in a fishing position on a rod, within the upper rear quadrant of said cavity and being generally upwardly facing therewithin and being movably tilted about the central axis of said clutch control shaft means during actuation of said clutch operating means substantially within the confines of said cavity,
   said manually operable drive means comprising a pinion slidably axially movable on said spool shaft means,
   said clutch means comprising a first clutch member extending axially from said spool means and a second clutch member carried by said pinion and shiftable axially relative to said first clutch member for driving engagement and disengagement relative thereto,
   lever means for shifting said pinion and said second clutch member axially relative to said first clutch member,
   said cam means comprising a first annular cam member fixedly mounted on said clutch control shaft means for rotation therewith and having an axially facing cam face, a second annular cam member fixed to said lever means and being guided on said clutch control shaft means for axial movement relative thereto and having an axially facing cam face confrontingly engaging the cam face of said first annular cam member for coacting camming engagement therewith,
   means on said reel for preventing rotation of said lever means and said second cam member, and
   spring means urging said lever means and said second cam member in a direction to effect engagement of the cam faces of said first cam member and said second cam member whereby manually induced rotational movement of said clutch control shaft means effects axial shifting of said lever means to disengage said first clutch member and said second clutch member, said spring means and said first cam member and said second cam member coacting to normally urge said clutch control shaft means to a position to be rotated by the thumb of the fisherman when placed on said force applying control surface means whereby said first clutch member and said second clutch member are disengaged when said clutch control shaft means is rotated by the fisherman and whereby said first clutch member and said second clutch member are reengaged upon removal of forces exerted on said clutch control shaft means by the thumb of the fisherman through said force applying control surface means.

2. The invention as defined in claim 1 and further comprising:

oppositely facing axially spaced end plate means forming part of said housing means and defining side wall portions of said cavity, coaxially aligned shaft openings in each of said end plate means, said bearing means in each of said housing means being coaxially aligned with said shaft openings, and opposite ends of said shaft means extending through said openings and being rotatably mounted in said bearing means, 3. The invention as defined in claim 2 and further comprising:

radially extending flange means on opposite ends of said spool means terminating in closely spaced relationship adjacent said side wall portions of said cavity defined by said end plates, said shaft openings being located next adjacent said flange means and spaced radially inwardly of the outer peripheral surfaces of said housing means a substantial distance sufficient to locate said shaft means and said second surface means closely adjacent the line wound on said spool means.

* * * * *